US006981455B2

(12) United States Patent
Lefcort (10) Patent No.: US 6,981,455 B2
(45) Date of Patent: Jan. 3, 2006

(54) TWO-STAGE WET WASTE GASIFIER AND BURNER

(76) Inventor: Malcolm D. Lefcort, 3040 West 5th Avenue, Vancouver, British Columbia (CA) V6K 1T9

( * ) Notice: Subject to any disclaimer, the term of this patent is extended or adjusted under 35 U.S.C. 154(b) by 0 days.

(21) Appl. No.: 10/383,991

(22) Filed: Mar. 7, 2003

(65) Prior Publication Data

US 2003/0196577 A1 Oct. 23, 2003

Related U.S. Application Data

(60) Provisional application No. 60/362,831, filed on Mar. 8, 2002.

(51) Int. Cl.
 *F23K 3/08* (2006.01)
(52) U.S. Cl. .................................. 110/268; 110/101 R
(58) Field of Classification Search ................ 110/267, 110/268, 115, 110, 101 R, 224, 226, 228, 110/227, 225, 293, 118
See application file for complete search history.

(56) References Cited

U.S. PATENT DOCUMENTS

| 820,783 | A | * | 5/1906 | Harcharick | ................. | 110/275 |
|---|---|---|---|---|---|---|
| 1,831,912 | A | * | 11/1931 | Hoffman | .................... | 110/190 |
| 3,985,084 | A | | 10/1976 | Delaplace | | |
| 4,170,183 | A | | 10/1979 | Cross | | |
| 4,172,425 | A | | 10/1979 | Sheridan | | |
| 4,177,740 | A | | 12/1979 | Lamb et al. | | |
| 4,200,047 | A | | 4/1980 | Knorr | | |
| 4,203,374 | A | | 5/1980 | Frederick | | |
| 4,239,029 | A | | 12/1980 | Martin et al. | | |
| 4,250,819 | A | | 2/1981 | Pauli | | |

(Continued)

OTHER PUBLICATIONS

Lefcort, Malcolm D., Gasification/Two-Stage Combustion of Sawmill Wood Waster and the Pending Ban on Beehive Burners by the BC Ministry of Environment; Residual Wood Residues to Revenues Conference: Nov. 1995 Richmond, Canada.

*Primary Examiner*—Kenneth Rinehart
(74) *Attorney, Agent, or Firm*—Robert H. Barrigar (57) ABSTRACT

In a two-stage wet waste burner, a first-stage combustion chamber has a symmetrical grate arrangement. The grate comprises spaced individual upright air supply tubes with flat horizontal upper surfaces swept by ash-removal plates. The height and width of the air supply tubes are selected to provide an upper surface profile approximating the natural angle of repose of the waste. Twin waste feed distribution augers span the chamber and rotate in mating troughs. The axis of rotation of each auger is sloped so that the discharge end of the auger is higher than the feed inlet end, and the trough sidewalls are inclined downwardly from the inlet end to the discharge end; these attributes promote even discharge of waste across the span of the chamber. Vertical walls of the air supply tubes are provided with air ports for supplying combustion air, the vertical orientation of the apertures and a degree of shielding of the upper surfaces of the air supply tubes inhibit clogging of the air ports. Drivers for the ash-removal plates comprise pendular arms each pivoting about an upper pivot point lying substantially in the vertical plane of symmetry, each arm being pivotally connected directly or indirectly to the ash removers. A burner of the foregoing type may be combined with a dryer for drying a portion of the waste and with a mixer that mixes dried waste with raw wet waste and feeds the mixed waste to the burner. The mixed waste can be efficiently burned yet can be efficiently conveyed. Such combination is particularly suitable for combustion of sewage sludge.

7 Claims, 6 Drawing Sheets

U.S. PATENT DOCUMENTS

| | | |
|---|---|---|
| 4,253,407 A | 3/1981 | Larson |
| 4,320,710 A | 3/1982 | Steiner et al. |
| 4,337,711 A | 7/1982 | Bolton |
| 4,450,776 A | 5/1984 | Stevenson |
| 4,471,704 A | 9/1984 | John et al. |
| 4,475,468 A | 10/1984 | Ishikawa |
| 4,479,441 A * | 10/1984 | Somodi ............ 110/257 |
| 4,494,469 A | 1/1985 | da Silva Pinto |
| 4,548,139 A | 10/1985 | Weber |
| 4,563,959 A | 1/1986 | Fujiwara |
| 4,569,437 A | 2/1986 | Doerges |
| 4,598,651 A | 7/1986 | Flickinger et al. |
| 4,638,905 A | 1/1987 | Weiss |
| 4,671,190 A | 6/1987 | Moreau |
| 4,676,176 A | 6/1987 | Bonomelli |
| 4,686,913 A | 8/1987 | Kaminski et al. |
| 4,706,578 A | 11/1987 | Basic, Sr. |
| 4,719,900 A | 1/1988 | Martin |
| 4,747,355 A * | 5/1988 | van Berkum ............ 110/229 |
| 4,793,471 A | 12/1988 | Bartels |
| 4,884,516 A | 12/1989 | Linsen |
| 4,895,084 A | 1/1990 | Kroon et al. |
| 4,913,067 A | 4/1990 | Gaskin et al. |
| 4,955,296 A | 9/1990 | Barlow |
| 4,996,930 A | 3/1991 | Yip et al. |
| 5,033,396 A | 7/1991 | Pauli |
| 5,069,146 A | 12/1991 | Dethier |
| 5,197,397 A | 3/1993 | Yamagishi et al. |
| 5,245,983 A | 9/1993 | Krieger |
| 5,271,339 A | 12/1993 | Yamagishi et al. |
| 5,277,136 A | 1/1994 | Davis |
| 5,323,717 A | 6/1994 | Gaskin et al. |
| 5,528,992 A | 6/1996 | Cole |
| 5,538,128 A | 7/1996 | Stierll et al. |
| 5,549,471 A | 8/1996 | Tegtmeier et al. |
| 5,673,636 A | 10/1997 | Stiefel |
| 5,680,821 A | 10/1997 | Wright et al. |
| 5,836,758 A | 11/1998 | Menzel et al. |
| 5,899,149 A | 5/1999 | Binner et al. |
| 5,906,194 A | 5/1999 | Wedel |
| 5,913,274 A | 6/1999 | Kunzli et al. |
| 6,024,032 A | 2/2000 | Sharpe |
| 6,155,184 A | 12/2000 | Stiefel |
| 6,213,031 B1 | 4/2001 | Kunzli et al. |

* cited by examiner

TWO-STAGE WET WASTE GASIFIER AND BURNER

CROSS REFERENCE TO RELATED APPLICATION

This application is a Utility Patent application based on a previously filed U.S. Provisional Patent application, U.S. Ser. No. 60/362,831, filed on Mar. 8, 2002, the benefit of the filing date of which is hereby claimed under 35 U.S.C. §119(e).

FIELD OF THE INVENTION

The invention relates generally to two-stage wet waste gasifier burner design and specifically to a design for a two-stage wet waste gasifier burner including a self-cleaning ash removal system, a novel profile for grate support and grate layout, a novel grate conformation and ash plate mechanism, and a novel fuel feeder system.

BACKGROUND OF THE INVENTION

Wood-waste fuel burners, sometimes known as hog fuel burners, have generally been inefficient in combustion, discharging undesirable amounts of gaseous and particulate pollution. In addition, when the gaseous effluent from such burners is used to heat a boiler, the gases emitted to the boiler have typically been dirty, causing depositions on the heat transfer tubes of the boiler, which, as a consequence, require frequent and expensive cleaning. Some of the disadvantages of wood-waste fuel burners have been addressed in the development of previously known two-stage wood-waste gasifier burners, such as described in U.S. Pat. No. 4,177,740 to Lamb, et al. Such two-stage gasifier burners combust wood waste that is heaped on a grate in the first stage of the burner to form a conical pile of fuel, commonly fed into the burner from below, with preheated underfire air percolating up through the pile in controlled amounts, drying and gasifying the waste fuel in the pile. The volatile gases driven off the pile are then partially oxidized by additional combustion air introduced into the first stage with the total amount of combustion air admitted to the first stage being maintained at less than stoichiometric proportions so that the temperature in the first stage remains lower than that necessary to melt the natural ash, dirt or other inorganic substances in the fuel. The volatile gases are discharged from the throat at the top of the first stage of the burner and enter the second stage, generally located directly above the first stage. In the second stage, secondary combustion air is introduced in an amount sufficient to allow complete combustion of the remaining volatile gases before the products of combustion exit the second stage of the burner to be used for process heat or directly exhausted to the environment.

However, even though prior combustion chamber designs have addressed the problem of gaseous combustion and particulate removal from the gaseous effluent, two-stage wood-waste gasifier burners known in the prior art, as described above, suffer from inefficiencies in operation due in large part to inefficient or impractical fuel supply and ash removal systems. Such inefficiencies in the material handling systems of known gasifier burners tend to cause less efficient gasification of fuel due to uneven distribution of wood-waste on grate surfaces, potentially lengthy and frequent shutdowns for removal of ash and residues due to inefficient ash collection and removal equipment, and overall reduction in wood-waste throughput and thermal generation.

Wet waste other than wood waste can also be burned, but biomass waste of any sort does not burn efficiently at moisture content levels above about 60%. Furthermore, some types of biomass waste, such as sewage sludge, are not easily conveyed if their moisture content falls appreciably below 60%. Below the 60% moisture content level, the sludge tends to become cohesive, requiring unacceptably high consumption of energy for its conveyance. The reason for this is understood to be the tendency of water to combine hygroscopically with fiber in the sludge. At higher moisture content, the sludge moves relatively freely in auger-type conveyors, and any binding within the sludge that occurs tends to be tolerable. These two characteristics of wet biomass waste create the conundrum that if the waste can be efficiently burned, it cannot be efficiently conveyed, and vice versa. A technique is needed that will overcome or at least mitigate the foregoing problem.

SUMMARY OF THE INVENTION

The present inventive two-stage wet-waste gasifier burner addresses some of the problems and inefficiencies inherent in the design of prior gasifier burners described above, and in particular, includes relatively simple and efficient inventive designs for the wet-wood-waste feed apparatus and feed control system, gasification grate geometry and underfire air supply, and ash plate and ash removal actuation apparatus and control systems. Such inventive designs provide for relatively high efficiency and reliability of operation of the present inventive two-stage wet-waste gasifier burner.

The gasifier to be described in detail in this specification is particularly suitable for the combustion of wet wood waste. However, with suitable adaptation, the gasifier may also be used for burning other types of wet biomass waste, including sewage sludge.

Further, in accordance with the invention, an apparatus and method for burning wet waste having a relatively high moisture content comprises, in its method aspect, drying a selected portion of the waste to a relatively dry solid consistency such that water binding of the waste is substantially reduced, mixing dried waste with wet waste in proportions selected to support two-stage combustion of the mixed product and to support ease of conveyance of the mixed product, and burning the combustible portion of the mixed product preferably in a two-stage combustion process that preferably but not necessarily includes the two-stage wet-waste combustion apparatus according to the invention. The combustion effluent may be used to generate electricity and may be treated using a selective catalytic reaction to reduce the content of noxious gases in the ultimate effluent delivered to the atmosphere.

In its apparatus aspect, the foregoing inventive concept may be expressed as the combination of apparatus comprising, in a preferred embodiment a) a divider for dividing the waste proportionally into a direct-feed component and a component to be dried;

b) a dryer for receiving from the divider and drying the component to be dried to a relatively dry solid consistency such that water binding of the waste is substantially reduced;

c) a mixer for receiving and mixing dried waste with wet waste in proportions selected to support two-stage combustion of the mixed product and to support ease of conveyance of the mixed product; and d) a burner (preferably a two-stage burner in accordance with the burner aspect of the invention) for burning the combustible portion of the mixed product.

The wet-wood or other biomass-waste feed system in a preferred embodiment of the present inventive gasification chamber, including a burner, incorporates a twin-auger conveyor including two separate single-helix augers rotating within separate parallel partial enclosures and driven by separate rotary motors, such as hydraulic motors. In a preferred embodiment, the two auger conveyors are installed along the central vertical plane of symmetry of the gasification chamber above the level of the grate arrays, one on either side of the plane of symmetry, such that they span the entire length of the gasification chamber, and such that the auger on each side of the central vertical plane of symmetry supplies fuel material to the grate array on the same side of the plane. The augers are supported for rotation in open troughs within the gasification chamber, said troughs having sidewalls which slope downwardly from the input end to the output end of the troughs. In the preferred embodiment of this twin-auger fuel feed apparatus, each auger is mounted on a slight incline to the horizontal, so that the sidewalls of the troughs, which slope downwardly from the input end to the output ends of the troughs, are horizontal. In other words, the input proximal end of the auger is lower than the distal end distant from the proximal end. The distal ends of the troughs are preferably fitted with a reverse auger flight in order to prevent binding of the augers by undischarged fuel material at the distal end of the auger.

As a result of the inventive combination of the proximal-to-distal upward slope of the auger and the proximal-to-distal downward slope of the trough sidewall, the fuel material transported by the auger tends to be discharged and fall onto the underlying grate surface in a relatively uniform distribution over the entire length of the augers, and therefore over the entire length of the grate arrays. Such uniform distribution of the fuel results in greater efficiency of gasification and consequently decreased combustive residues including particulate and ash. The uniform distribution of fuel over the grate surface also allows for accurate monitoring of the fuel pile height using conventional nuclear sensors (such as those using Cesium 137 radionuclides) mounted on the walls of the first stage of the burner, or some other suitable location. Signals from such nuclear sensors can be used to control the speed of the rotary motor powering the fuel feed augers, and thereby control the depth of the fuel pile on the grates to maintain a fuel pile height conducive to optimum gasification efficiency.

In a preferred embodiment of the fuel feed control system for the inventive gasifier burner, nuclear pile height sensors positioned to detect the height of the fuel pile on each gasifier grate array are connected to at least one control unit, such that the control unit is responsive to signals received from such pile height sensors. Such a control unit is also connected to the rotary motors powering the fuel feed augers such that the motors are responsive to signals received from the control unit. The control unit functions such that when the fuel pile height drops below a suitable empirically determined lower limit for efficient gasification, as detected by signals received from the fuel pile height detectors installed above one of the grate arrays, a signal is sent to the motor controlling the fuel feed auger for that grate array such that the rate of fuel feed is increased by a suitable amount. Similarly, when the fuel pile height exceeds a suitable empirically determined upper limit for efficient gasification, as detected by signals received from the fuel pile height detectors mounted above a grate array, a signal is sent to the applicable auger motor such that the rate of fuel feed to that grate array is suitably decreased. In this way, the rate of fuel feed to each of the two grate arrays is controllable to maintain a preferred optimum fuel pile height, with relatively uniform fuel distribution across the length of the grate array, resulting in improved gasification efficiency.

It has been found through empirical methods that the optimum fuel pile height for effecting optimum fuel gasification depends upon the type of fuel used, and the moisture content of the fuel. In a preferred embodiment of the invention, shredded (to nominal particle sizes of less than about 1–5 inches) wet wood waste is commonly used as the fuel, with moisture contents typically ranging from about 30% to about 65% on a wet basis. Alternatively, other types of biomass reduced to suitable particle sizes for handling by the fuel feed system can also be used as fuel in the present inventive gasifier burner, albeit with potentially reduced efficiency. Through empirical testing, it has been found that the optimum fuel pile height increases as the moisture content of the fuel increases, due to the increased amount of water that must be evaporated, which in turn requires a longer residence time of the fuel in the fuel pile and thus a greater fuel pile height. In order to vary the fuel pile height required to optimize gasification of fuels having significantly different moisture contents, in accordance with another aspect of the invention, a preferred embodiment of the inventive twin auger fuel feeding system can be vertically raised or lowered with respect to the underlying grate surface to increase or decrease the fuel pile height as required. In a preferred embodiment of the inventive burner, the twin auger feeder system can be vertically movably mounted to the burner support structure (including the outer walls of the burner and the central A-frame support structure) by any appropriate means in order to allow the raising or lowering of the fuel feeding system to adjust the height of the fuel pile to correspond to changes in moisture content of the fuel. Alternatively, the fuel feeding system can be fixed to the burner support structure, and the grate arrays and accompanying ash removal system can be vertically movably mounted to the support structure to allow the raising and lowering of the grate and ash removal system to effect changes in the fuel pile height.

A preferred embodiment of the gasifier burner of the present invention incorporates a relatively simple and efficient inventive combustion grate configuration and associated underfire air supply system. In a preferred embodiment, each of the two symmetrical grate array substructures located on either side of the central vertical plane of symmetry of the burner are composed of a series of discrete grate boxes placed laterally adjacent to one another along the central vertical plane, wherein the rear of the grate boxes are nearest the central vertical plane. The grate boxes include a multiplicity of individual grate support plates installed at varying vertical heights spanning two laterally spaced side plates, the innermost grate support plates nearest the vertical plane of symmetry being highest, and the height of the grate support plates progressively decreasing with distance outward from the plane of symmetry, toward the front of the grate box, in an irregular stair step-like arrangement. For convenience of ash removal, the depths and installed heights of the grate support plates are substantially identical in each adjoining grate box. Ash removal plates are slidingly mounted for reciprocating forward and rearward horizontal motion across the top stationary surface of each grate support plate.

Fixed relative to each grate support plate in a preferred embodiment of the grate apparatus is an associated underfire air supply tube that extends along the length of the grate box, and serves to supply underfire air, preferably heated, to the fuel pile through a plurality of air exit ports drilled in the sidewall of the tube. In the aforementioned preferred embodiment of the present inventive gasifier burner, the underfire air supply tubes are rectangular in cross-sectional configuration, with a multiplicity of underfire air exit ports spaced along the outer surface of the forward vertical face of the air supply tube, relative to the rear of the grate box. This location of the air exit ports in a preferred embodiment of the invention advantageously provides for a relatively reduced likelihood of clogging of the air ports by particles of fuel, due at least in part to the fact that air is admitted through the vertical "riser" of each grate "step". The air supply tubes in a single grate box are each connected to a vertical air supply riser duct that extends vertically downwards from the center of the bottom wall of each air supply tube to connect to a common underfire air supply plenum, which extends centrally from the back to the front of the grate box underneath all of the air supply tubes. In such a way, the single air supply plenum supplies each of the air supply tubes in a particular grate box with (preferably heated) underfire air. The underfire air supply plenums extending centrally from the back to the front of each grate box are in turn connected to a suitable air supply, typically located external to the gasifier burner. In the foregoing description, "front" refers to the stepped outer profile of the grate arrays, and "back" refers to the interior of the grate arrays.

The underfire air supply tubes are spaced from one another transversely in a horizontal sense, and are also staggered from one another in a vertical sense so that those air supply tubes nearest the central vertical plane of symmetry of the gasifier chamber are highest, and those nearest the peripheral walls are lowest. The preferred slope or curvature of the grate (in a profile end view of the grate) achieved by the spacing of the air supply tubes and associated grate support plates is determined empirically to generally correspond to the angle of repose of the fuel material being burned, to improve the uniformity of the fuel pile lying on the upper surface of the grate. Further, the width of the individual grate support plates vary from the top to the bottom of the grate box, with the higher plates being narrower than those lower down on the grate box. As an additional feature of a preferred embodiment of the inventive grate design, the vertical dimension of individual rectangular air supply tubes in the grate box is selected so as to effect the required vertical spacing of the grate support plates which in combination with the variations in width of the grate support plates define the preferred slope or curvature of the grate surface, while at the same time permitting and simplifying the mechanism used to effect a reciprocal sliding motion of associated ash removal plates, as described below, for which the greater width of the lower grate support plates (ash support plates) requires a longer reciprocal sliding motion of the associated ash removal plates, relative to ash support plates installed higher in the grate box. The width of each ash support plate is preferably greater than the length of the associated ash removal plate by an amount equal to the travel of the ash removal plate, so that all of the ash lying on the support plate is removed during one pass over the support plate by the ash removal plate.

Slidingly fitting between the upper surface of each grate support plate and the air supply tube directly above it are two associated ash removal plates that lie on top of the grate support plate and are in sliding contact with both the grate support plate below them and the air supply tube above them. The two ash removal plates sliding on top of each grate support plate are laterally spaced apart from each other; one ash plate is located on either side of the central vertical air supply riser duct connected to the air supply tube above the ash plates.

Each ash removal plate is connected to a horizontally reciprocating connecting arm element that extends generally horizontally from the rear edge of the ash plate towards the central plane of symmetry of the burner chamber, terminating in a connection with a suitable drive device. In a preferred embodiment, the drive devices that drive the ash removal plates are each a generally vertically oriented pendular driving element. As there are two laterally separated sets of ash removal plates in each grate box, one set located on one side of the central vertical air supply riser duct, and one set on the opposite side of the duct, there are two corresponding vertical pendular driving elements for each grate box, each connected by means of multiple horizontal connecting arm elements to one set of ash removal plates. The pendular driving elements are suspended from pivoting joints located above the highest grate support plate at the rear (nearest to the centre of the gasifier chamber) of each grate box. The pivoting joint at the top of the pendular driving element, and the portion of the pendular element extending above the highest grate support plate are enclosed within a cylinder attached to the top of the uppermost grate support plate, such that the pendular element and associated pivoting joint are protected from falling fuel material from the fuel feed system above. The bottom of each pendular driving element is vertically slidably pivotally connected to a horizontally sliding linear mechanism having one or more linear bearings in such a way as to allow a horizontally reciprocating motion of the said linear mechanism, oriented in a direction parallel to the side plates of the grate box, to produce a swinging motion of the pendular element about its pivot, said swinging motion also parallel to the sides of the grate box. The slidable pivotal connection at between the bottom of the preferred pendular driving element and the linear mechanism allows for the relatively small vertical movement of the bottom of the preferred pendular element as it swings forward and rearward of a central vertical position. Alternatively, the connection at the bottom of the preferred pendular element can be purely pivotable and the pivot at the top of the preferred pendular element can allow vertically slidably pivotal movement to accomodate relatively small vertical movements of the pendular element during its arcuate swinging path. By means of the foregoing linkage, the frontward-and-rearward horizontal reciprocation of the linear mechanism located at the bottom rear of the grate box imparts a frontward-and-rearward swinging motion to the pendular drive that in turn imparts a frontward-and-rearward horizontally reciprocating sliding motion to the sliding ash removal plates. Each of the linear mechanisms located at the bottom rear of a particular grate box is connected to a suitable controllable actuator mechanism located outside the gasifier chamber by means of an actuator connecting element, such that the actuator mechanism is capable of causing a horizontal reciprocation of the linear mechanism, which causes swinging of the pendular drive, which in turn generates the sliding reciprocation of the ash removal plates.

In a preferred embodiment of the inventive burner, the length of the pendular driving element, the vertical dimensions and therefore vertical spacing of the individual underfire air supply tubes, the widths of the grate support plates (ash support plates), and therefore the horizontal spacing of the air supply tubes, and the stroke length of the actuator and therefore also the stroke of the linear mechanism, are determined empirically to produce the preferred sloping profile of the grate surface which generally approximates the angle of repose of the fuel material, as described above. The design of the pendular driving element, air supply tubes, grate support plates and stroke of the actuator is also preferably optimized to result in the efficient synchronous horizontal reciprocation of the ash removal plates such that in their fully extended position, corresponding to maximum forward travel of the linear mechanism and ash removal plates towards the front of the grate box, the sliding ash removal plates cover most or all of the upper surface of the grate support plates, and in fully retracted position, corresponding to maximum rearward travel of the linear mechanism and ash removal plates, the ash removal plates retract as far as the outside surface of the air supply tube above, leaving the upper surfaces of the grate support plates exposed to the fuel pile. Ash resulting from combustion of the fuel nearest the grate that accumulates on these upper surfaces of the grate support plates is swept off the grate support plates by the ash removal plates as the ash removal plates extend towards the front of the grate box under the motion of the preferred pendular driving element which is in turn driven by the actuator mechanism. During subsequent reciprocating cycles of extension and retraction of the ash removal plates, the ash moves progressively downwardly also from the innermost higher grate support plates to the outermost lower support plates, and thence to an ash collection trough located below the outermost grate support plate from whence it can be removed by conventional means. In a preferred embodiment of the invention, such conventional ash removal means include an auger ash conveyor powered by a controllable rotary motor that functions to remove ash from the ash collection trough to ash disposal means installed outside of the gasifier burner structure. In this way, the relatively simple design of the present inventive ash plate reciprocation and ash removal systems provide for increased operating efficiency of the inventive gasifier burner by reducing the need for frequent and lengthy shutdowns to manually remove ash buildup and maintain complex ash plate actuation systems as is required by many of the gasifier burners known in the prior art.

In another inventive aspect of the present gasifier burner design, at least one control unit is implemented to control the operation of the reciprocating ash removal plates and associated ash removal system. Conventional thermal sensors are installed near the surface of at least one of the grate support plates in at least one grate box such that the sensors are responsive to temperature changes at the surface of the grate support plates, and are also connected to the control unit such that the control unit is responsive to signals sent from the thermal sensors. The control unit is also connected to the motor powering the ash removal system such that the motor is controlled by signals received from the control unit. The control unit is further connected to the controllable actuator mechanisms that drive the ash removal plates such that the actuator mechanisms are controlled by signals received from the control unit. The control unit functions such that when the temperature at the surface of the grate support plates decreases below a suitable empirically determined lower limit indicating a buildup of ash on the surface of the support plate, signals are sent to activate the actuator mechanisms and the ash removal system motor such that the ash removal plates reciprocate and the ash removal system operates to remove ash from the ash collection trough at the bottom of the gasifier burner. Similarly, when the temperature at the surface of the grate support plates increases above a suitable empirically determined upper limit indicating the removal of ash and the proximity of burning fuel to the surface of the support plates, signals are sent to deactivate the actuator mechanisms and the ash removal system motor such that the ash removal plates stop moving and the ash removal system stops operating. In this way the design of the present inventive gasifier burner provides for increased gasification efficiency during extended operation by controlling the buildup of ash on the gasifier grate, and the removal of accumulated ash from the bottom of the gasifier burner.

DETAILED DESCRIPTION OF THE INVENTION WITH REFERENCE TO THE DRAWINGS

Figure 1:
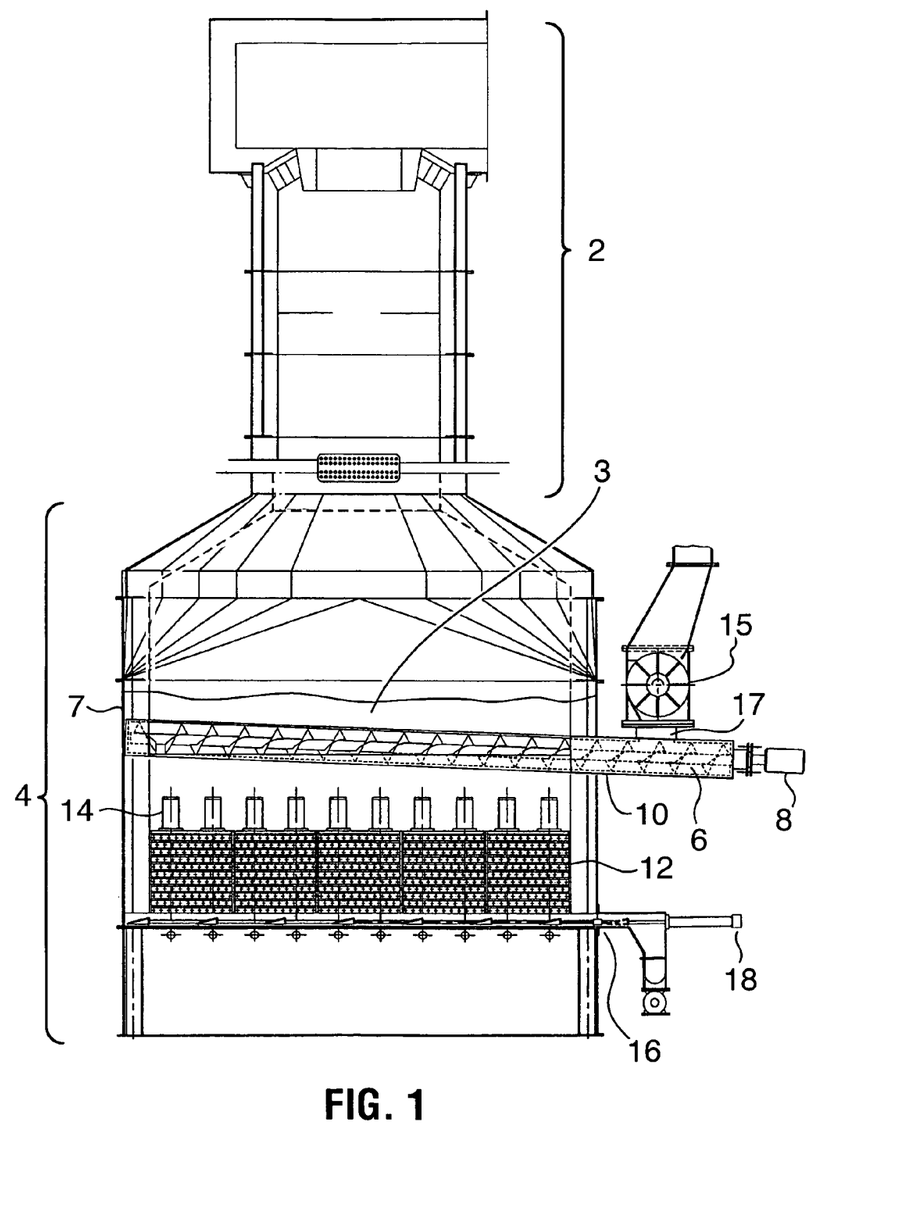
FIG. 1 is a schematic section elevation view of a preferred embodiment of the two-stage wet-wood-waste gasifier burner of the present inventive design.
Figure 2:
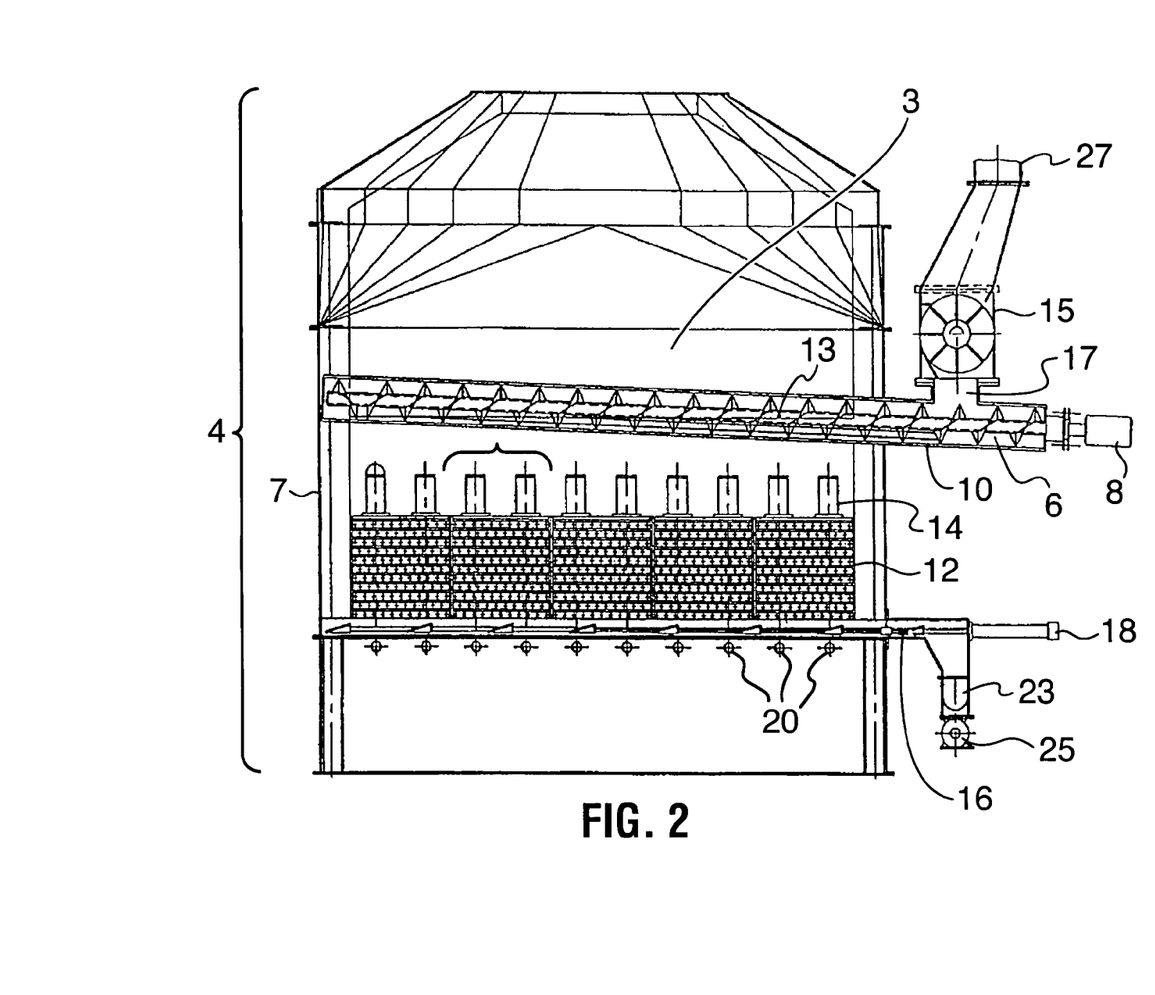
FIG. 2 is a detailed schematic section elevation view of a preferred embodiment of the first stage of the inventive gasifier burner showing the inventive feed system and grate design.
Figure 3:
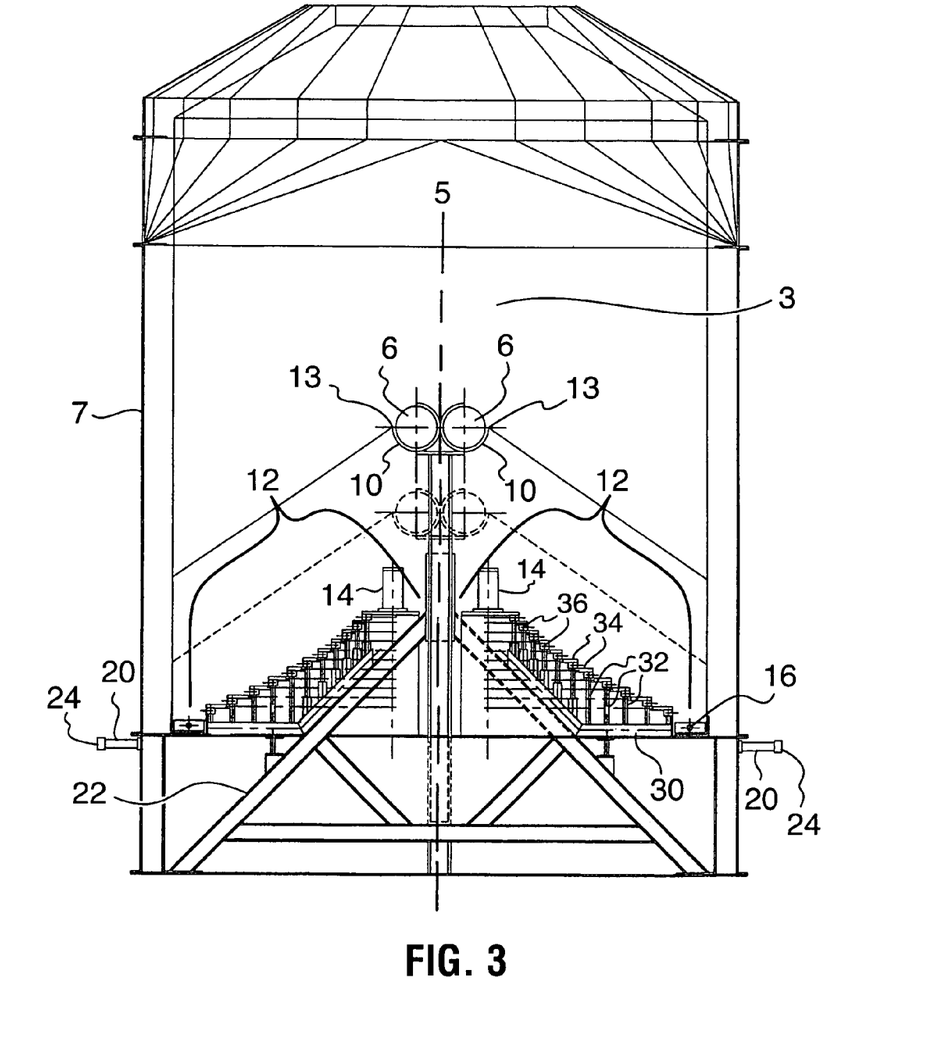
FIG. 3 is a schematic section elevation view through the grate and A-frame grate support of a preferred embodiment of the first stage of the inventive gasifier burner.

The structure and arrangement of the elements of a preferred embodiment of the inventive twin-auger fuel feed system are shown in FIGS. 2 and 3. The two substantially identical fuel feed augers 6 and associated additional components of the fuel feed system including auger troughs 10 and rotary motors 8 are symmetrically located on either side of the central vertical plane of symmetry 5 of the chamber 3 and above the underlying grate arrays 12. Each auger 6 spans the entire length of the chamber 3 and supplies fuel material to the corresponding underlying grate array 12 on the same side of the plane 5 as the auger 6. In a preferred embodiment of the invention, the augers 6 are of a conventional single helix design, and are supported for rotation in troughs 10 which are in the form of open troughs over the portion of their length located within the interior burner chamber 3, and are fully closed over the portion of their length located outside of the burner chamber 3.

In a preferred embodiment of the invention, each auger 6 is supplied with fuel from an associated fuel supply metering bin 27 located above the auger trough 10 near the end of the auger which is outside the outer wall of the burner chamber 3, entering the auger trough 10 through an opening 17 in the top of the trough 10. (Only the exit chute of bin 27 is illustrated in FIG. 2). The upper edge of the outer sidewall 13 of each enclosure 10 slopes downwardly from the point at which the auger 6 enters the chamber 3 to the end of the auger 6 and auger trough 10 adjacent to the outer wall 7 at the opposite side of the chamber 3. Additionally, in the preferred embodiment, each auger 6 and associated enclosure 10 is mounted on a slight incline to the horizontal as the auger 6 extends across approximately the interior diameter of the chamber 3. As a result of the inventive combination of the upward slope of the auger 6 and the downward slope of the upper edge of the outer sidewall 13 of the auger trough 10, the fuel material transported by the auger 6 tends to be discharged and fall onto the surface of the underlying grate array 12 in a relatively uniform distribution over the entire length of the auger 6, and therefore over the entire length of the corresponding grate array 12. Such uniform distribution of the fuel results in greater efficiency of gasification and overall combustion of the fuel. A residue feed rotary air lock 15 prevents hot producer gas from leaving the gasification chamber 3 and escaping to the metering bin 27.

In a preferred embodiment of the invention, the uniform distribution of fuel over the surface of the grate arrays 12 as described above also allows for accurate monitoring of the fuel pile height using nuclear sensors (not shown) of conventional design mounted on the outer wall 7 of the burner, or some other suitable location. A control unit (not shown) suitably connected to both the pile height sensors (not shown) and the auger motors 8 can be used to detect signals from such pile height sensors (not shown) and to control the speed of the rotary motor 8 powering each fuel feed auger 6, and thereby control the depth of the fuel pile on the surface of the grate arrays 12 to maintain a fuel pile height conducive to optimum gasification efficiency.

Figure 4:
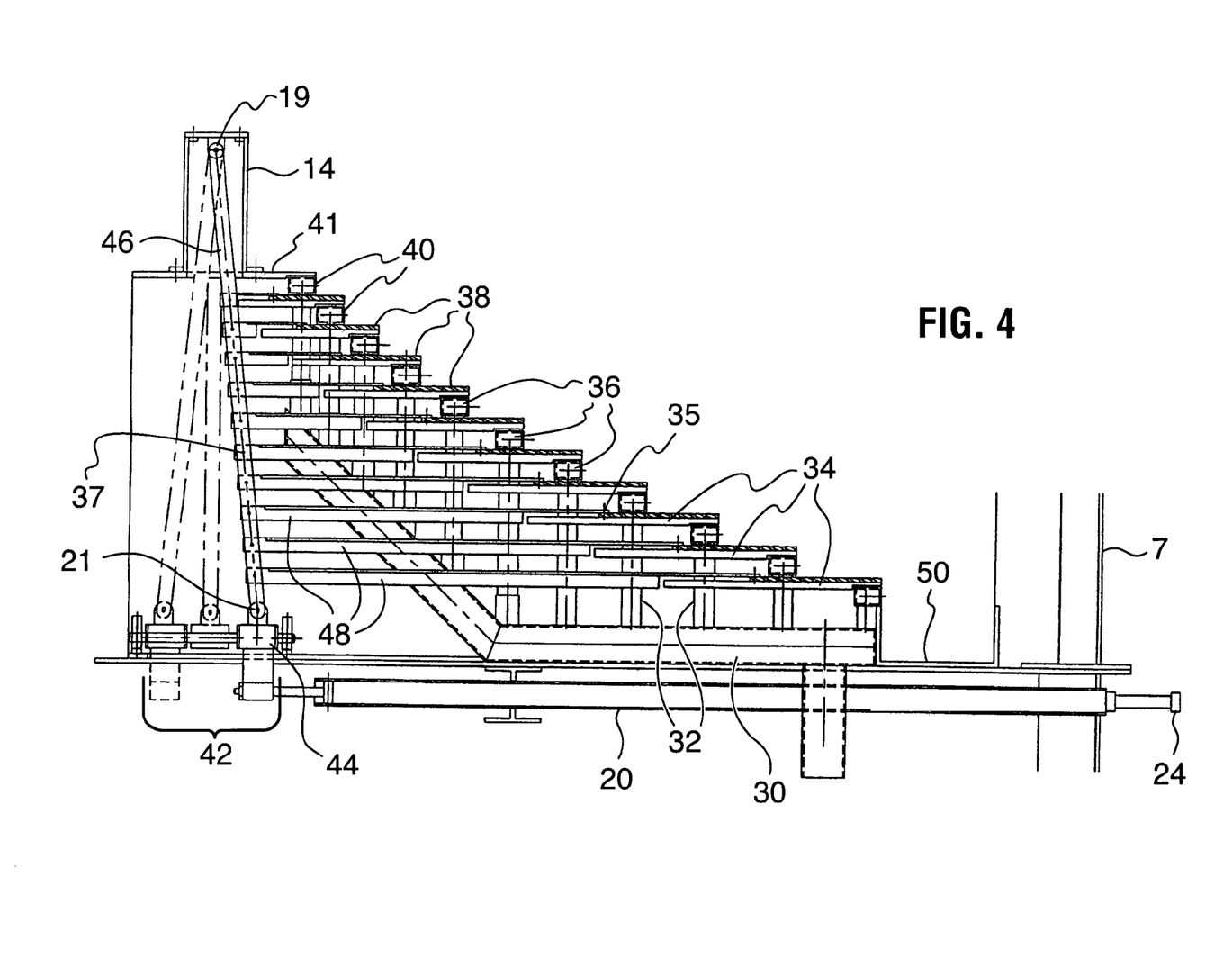
FIG. 4 is a detailed schematic section elevation view through the grate of a preferred embodiment of the inventive gasifier burner showing the grate design and ash removal plate actuator system.
Figure 5:
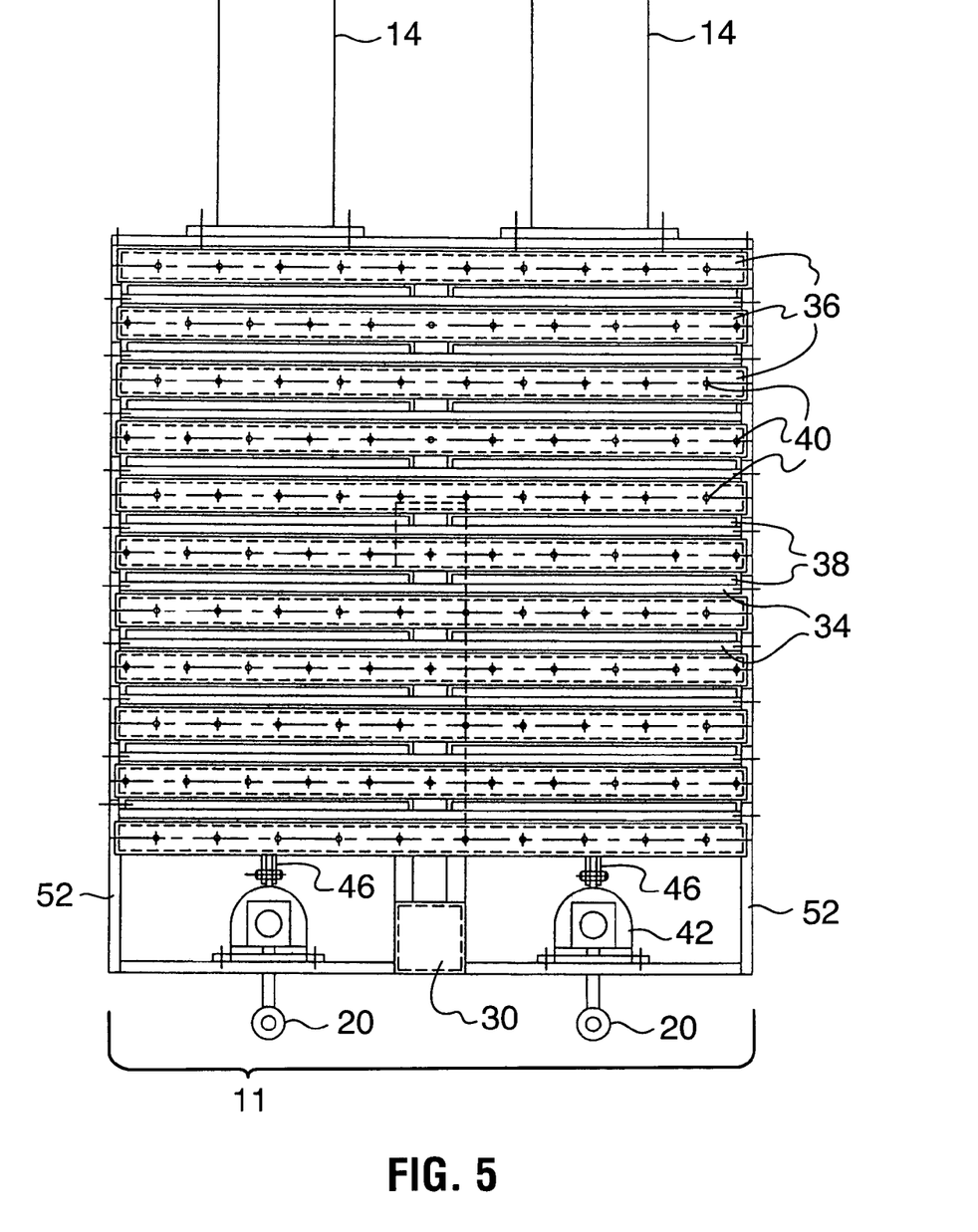
FIG. 5 is a schematic front elevation view of a grate box of a preferred embodiment of the inventive gasifier burner.
Figure 6:
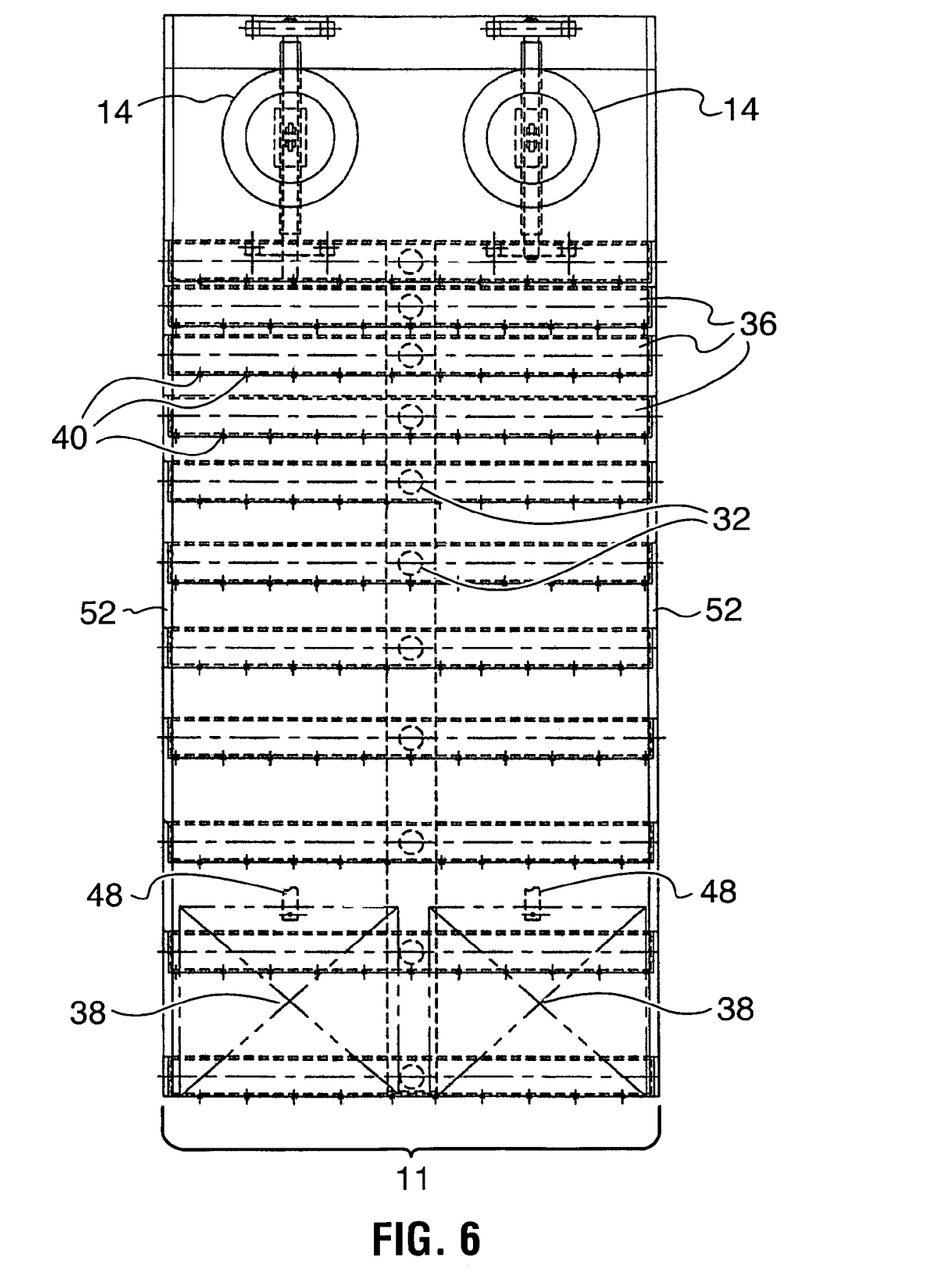
FIG. 6 is a plan view of the grate box of FIG. 5.

The structure and arrangement of the elements of each of the substantially identical inventive grate boxes 111 making up each grate array 12 of a preferred embodiment of the present invention are shown in cross-sectional view in FIG. 4, and also in the front elevation view of a preferred grate box 11 in FIG. 5, and the plan view of a preferred grate box 11 in FIG. 6. Each grate box 11 is oriented such that the rear of the grate box 11 is located closest to the central plane of symmetry 5 in the burner chamber 3, and extends forward, away from the plane 5. Each grate box includes multiple grate support plates 34 installed at varying vertical heights spanning two laterally spaced side plates 52 which define the sides of the grate box 11. The grate support plates 34 are fixed to the grate box side plates 52 by appropriate fastening means, such as conventional countersunk steel bolts. The grate support plates 34 nearest the rear of the grate box 11, which are also closest to the vertical plane of symmetry 5, are affixed at the greatest height, and the height of the grate support plates 34 progressively decreases with distance outward from the plane of symmetry 5, toward the front of each grate box 11, forming an irregular stair step-like arrangement as shown in FIG. 4. Ash removal plates 38 are slidingly mounted for reciprocating horizontal motion towards the front and back of the grate box 11, across the top surface of each fixed grate support plate 34. The grate box side plates 52, grate support plates 34 and ash removal plates 38 are preferably constructed out of a suitably strong and heat resistant metal, such as steel. In the case of the support plates 34 and ash plates 38 such metal is preferably also suitably resistant to the abrasive wear sustained by repeated forward and rearward reciprocation of the ash plates 38 over the top surface of the grate support plates 34.

It is useful to refer in this description and the appended claims to the length or width, or both, of various components of the grate arrays 12, such as the ash support plates 34. For this purpose, "length" is the (horizontal) dimension perpendicular to the plane of the view of FIG. 3, and "width" is the horizontal dimension in the view of FIG. 4. In this latter view, the widths of the ash support plates 34 increase progressively from the top to the bottom of the grate arrays 12.

Fixed below each grate support plate 34 in a preferred embodiment of the inventive grate box 11 is an associated underfire air supply tube 36 that extends laterally across the entire width of the grate box 11, and serves to supply heated underfire air to the fuel pile which rests on the upper surfaces of the grate support plates 34 through multiple air exit ports 40 drilled in the sidewall of each air supply tube 36. In the preferred embodiment of the present invention shown in FIGS. 4, 5, and 6, the underfire air supply tubes 36 are rectangular in cross-sectional configuration, with multiple air exit ports 40 laterally spaced along the outer surface of the forward vertical face of each air supply tube 36. The air supply tubes 36 in a particular grate box 11 are each connected to a vertical air supply riser duct 32 that extends vertically downwards from the center of the bottom wall of each air supply tube 36 to connect to a common underfire air supply plenum 30, which extends centrally from the back to the front of the grate box 11 underneath all of the air supply tubes 36. The air supply plenums 30 from each grate box 11 are in turn connected to a suitable source of heated air, typically located external to the gasifier burner (not shown). The air supply plenum 30, riser ducts 32 and air supply tubes 36 in a preferred embodiment of the present invention shown in FIGS. 4, 5 and 6 are preferably constructed of a suitably strong and heat resistant metal, such as steel. The air supply plenum 30 shown in FIGS. 4, 5 and 6 is preferably rectangular in cross-sectional configuration, while the air riser ducts 32 are preferably round in cross-sectional configuration.

In the preferred embodiment of the present invention shown in FIGS. 4, 5 and 6, two ash plates 38 are installed on the top of each grate support plate 34, laterally spaced apart from each other and located on either side of the central riser duct 32, such that the ash plates 38 fit slidingly between the upper surface of the associated underlying grate support plate 34 and the air supply tube 36 above them, and are in sliding contact with both the support plate 34 below, and the air tube 36. Each ash plate 38 is connected to a generally horizontal connecting arm 48 by means of a suitable connection 35 such as a pin joint for example. Each connecting arm 48 extends generally horizontally from the rear edge of the ash plate 38 towards the central plane of symmetry of the burner 5, and connects to preferred pendular drive 46 by means of a suitable connection 37 such as a pivoting pin joint. Each pendular drive 46 is preferably suspended from a pivoting pin joint 19 located above the highest grate support plate at the rear the grate box 11. The pivoting joint 19 at the top of each preferred pendular drive 46 is supported by a cylindrical enclosure 14 fixed to the uppermost grate support plate 41 of the grate box 11. The bottom of each pendular drive 46 is preferably slidably pivotally connected to a horizontally sliding linear mechanism 42 by a sliding pivoting pin joint 21. Alternatively the pin joint 21 at the bottom of the pendular drive 46 can be free to pivot only, and the pin joint 19 at the top of the pendular drive 46 can be free to both pivot and slide to allow the slight vertical displacement of the pendular drive 46 induced by its forward and rearward swinging motion. Each linear mechanism 42 having one or more linear bearings 44 is connected to an actuator 24 by means of an actuator connector 22 such that horizontal frontward and rearward movement of the actuator 24 produces a swinging motion of the pendular drive 46 pivot 19, which in turn drives the frontward and rearward sliding reciprocation of the ash plates 38 connected to the pendular drive 46.

In the preferred embodiment of the present invention shown in FIGS. 2 and 4, an ash collection trough 50 is installed directly in front of the grate boxes 11 and spans the entire length of the each grate array 12. Accumulated ash that is swept off the lowest grate support plates 34 and into the ash trough 50 by the action of the reciprocating ash removal plates 38, then falls through openings (not shown) in the bottom of the ash trough 50 onto an ash conveyor 16 of conventional design. Each ash conveyor 16 is powered by a controllable motor 18.

In another preferred embodiment of the present invention, multiple thermal sensors (not shown) of conventional design control are installed near the surface of at least one of the grate support plates 34 in at least one grate box 11 such that the sensors (not shown) are responsive to temperature changes at the surface of the grate support plates 34, and are suitably connected to at least one control unit (not shown). Such control unit (not shown) is additionally connected to the controllable motor 18 that powers the ash removal conveyor 16 that removes the ash from the ash trough 50 in front of the grate boxes 11 and is also connected to actuators 24 that drive the reciprocation of the ash plates 38. The control unit (not shown) operates in such a way as to activate the ash conveyor motor 18 and the ash plate actuators 24 when thermal sensors (not shown) respond to a temperature below a suitable empirically selected lower temperature limit, and to deactivate the ash conveyor motor 18 and the ash plate actuators 24 when the thermal sensors (not shown) respond to a temperature above a suitable empirically selected upper temperature limit.

Other variations and adaptations to the inventive subject matter above described will occur to one skilled in the art without departing from the scope of the invention which is defined by the claims.

What is claimed is:

1. In or for use in a first-stage gasifier chamber of a two-stage biomass waste burner, a grate comprising
   an array of vertically and horizontally spaced and longitudinally aligned waste support means;
   vertically and horizontally spaced and longitudinally aligned ash support and removal means; and
   vertically and horizontally spaced and longitudinally aligned air supply means;
   wherein
   the grate is substantially symmetrical about a vertical plane parallel to the longitudinal alignment of the ash removal plates;
   the waste support means includes the ash support and removal means;
   the air supply means are separate from the ash support and removal means;
   the air supply means have ports for introducing air into the gasification chamber;
   the ports are spaced from the ash support and removal means and, in operation, the ports introduce air into the gasification chamber in streams at a substantial angle to vertically upwards, thereby limiting interference between the air supply means and the ash support and removal means;
   the ash support and removal means comprise vertically and horizontally spaced, stacked, longitudinally aligned and horizontally movable ash removal plates having varying widths increasing from top to bottom of the grate and each in extended position overlying a unique associated stationary grate support plate;
   the ash support and removal means comprise reciprocating means for imparting to the ash removal plates synchronized reciprocating horizontal motion transverse to the longitudinal extension of the ash removal plates, thereby to direct ash downwardly from higher to lower ash removal plates;
   the distance of travel of each said ash removal plate imparted by the reciprocating means varies with the width of such ash removal plate; and
   the reciprocating means comprises a pendular drive having in the vicinity of its upper end a pivotally mounted driving arm, and for each said ash removal plate, means for pivotally coupling such support plate directly or indirectly to the pendular drive at an associated pendular drive coupling means, the pivot axis of each said coupling being horizontal and extending generally parallel to the longitudinal extension of the ash removal plates, the pendular drive coupling means being generally vertically spaced from one another along the driving arm at intervals generally corresponding to the vertical spacing between the ash removal plates.

2. A grate as defined in claim 1, wherein the driving arm includes at least one generally longitudinally extending sliding pivotal coupling, each said sliding pivotal coupling extending in length sufficiently to accommodate the vertical component of the arcuate swinging motion of the arm, thereby facilitating the impartation by the arm to the ash removal plates of a substantially horizontal motion.

3. A grate as defined in claim 1, comprising, for each said ash removal plate, an associated unique connecting arm pivotally coupled to the driving arm at an associated one of said pendular drive coupling means, said connecting arm also being coupled to an associated unique one of said ash removal plates.

4. A gasification chamber including therein a grate as defined in claim 1.

5. In or for use in a first-stage gasification chamber of a two-stage waste burner, a grate comprising ash support and removal means in turn comprising an array of vertically and horizontally spaced and longitudinally aligned horizontally movable ash removal plates substantially symmetrically arrayed about a vertical plane parallel to the longitudinal alignment of the ash removal plates, the ash support and removal means comprising reciprocating means for imparting to the ash removal plates synchronized reciprocating horizontal motion transverse to the longitudinal extension of the ash removal plates, thereby to direct ash downwardly from higher to lower ash removal plates, and wherein the distance of travel of each said ash removal plate imparted by the reciprocating means varies with the width of such ash removal plate, wherein the movable ash removal plates have varying widths increasing from top to bottom of the grate, and wherein the reciprocating means comprises a pendular drive having in the vicinity of its upper end a pivotally mounted driving arm, and for each said ash removal plate, means for pivotally coupling such support plate directly or indirectly to the pendular drive at an associated pendular drive coupling means, the pivot axis of each said coupling being horizontal and extending generally parallel to the longitudinal extension of the ash removal plates, the pendular drive coupling means being generally vertically spaced from one another along the driving arm at intervals generally corresponding to the vertical spacing between the ash removal plates.

6. A grate as defined in claim 5, wherein the driving arm includes at least one generally longitudinally extending sliding pivotal coupling, each said sliding pivotal coupling extending in length sufficiently to accommodate the vertical component of the arcuate swinging motion of the arm, thereby facilitating the impartation by the arm to the ash removal plates of a substantially horizontal motion.

7. A grate as defined in claim 5, comprising, for each said ash removal plate, an associated unique connecting arm pivotally coupled to the driving arm at an associated one of said pendular drive coupling means, said connecting arm also being coupled to an associated unique one of said ash removal plates.

* * * * *